(12) United States Patent
Rule et al.

(10) Patent No.: US 10,970,712 B2
(45) Date of Patent: Apr. 6, 2021

(54) DELEGATED ADMINISTRATION OF PERMISSIONS USING A CONTACTLESS CARD

(71) Applicant: Capital One Services, LLC, McLean, VA (US)

(72) Inventors: Jeffrey Rule, Chevy Chase, MD (US); Walter A. Miller, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/360,149

(22) Filed: Mar. 21, 2019

(65) Prior Publication Data

US 2020/0304311 A1   Sep. 24, 2020

(51) Int. Cl.
*G06Q 20/34* (2012.01)
*G06Q 20/38* (2012.01)
(Continued)

(52) U.S. Cl.
CPC ....... *G06Q 20/352* (2013.01); *G06Q 20/3829* (2013.01); *G06Q 20/405* (2013.01); *H04L 9/3234* (2013.01); *G06Q 2220/00* (2013.01)

(58) Field of Classification Search
CPC .............. H04L 9/3234; G06Q 20/352; G06Q 20/3829; G06Q 20/405; G06Q 2220/00
See application file for complete search history.

(56) References Cited

U.S. PATENT DOCUMENTS

| 4,683,553 A | 7/1987 | Mollier |
| 4,827,113 A | 5/1989 | Rikuna |

(Continued)

FOREIGN PATENT DOCUMENTS

| CA | 3010336 A1 | 7/2017 |
| CN | 101192295 A | 6/2008 |

(Continued)

OTHER PUBLICATIONS

Batina, et al., "SmartCards and RFID", Course PowerPoint Presentation for IPA Security Course, Digital Security at University of Nijmegen, Netherlands, (date unknown), 75 pages.

(Continued)

*Primary Examiner* — Calvin L Hewitt, II
*Assistant Examiner* — Arastoo (Ari) Shahabi
(74) *Attorney, Agent, or Firm* — Kacvinsky Daisak Bluni PLLC

(57) ABSTRACT

Delegated administration of permissions using a contactless card. In one example, a permissions module may receive a request from a first account to grant a second account access to a computing resource. The permissions module may receive permissions data of the first account from a contactless card and encrypted data generated by the contactless card. The permissions module may transmit the permissions data and the encrypted data to an authentication server, which may verify the encrypted data based at least in part on the private key, and determine, based on the permissions data, that the first account has permissions to grant access to the computing resource. The permissions module may receive, from the authentication server, an indication of the verification of the encrypted data and a permissions vector associated with the second account, the permissions vector reflecting the grant of access to the computing resource to the second account.

20 Claims, 14 Drawing Sheets

(51) Int. Cl.
  *G06Q 20/40* (2012.01)
  *H04L 9/32* (2006.01)

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 * | 4/2001 | Goldstein ............ G06Q 20/045 705/65 |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haab |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |

(56) References Cited

U.S. PATENT DOCUMENTS

| | | |
|---|---|---|
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |

(56) References Cited

U.S. PATENT DOCUMENTS

| | | |
|---|---|---|
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1* | 4/2011 | Tofighbakhsh ..... G06F 19/3418 235/380 |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0006415 A1* | 1/2013 | Paydar ................ G06F 19/3462 700/235 |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0293351 A1 | 11/2013 | Kuenzi et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |

(56) References Cited

U.S. PATENT DOCUMENTS

| | | |
|---|---|---|
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1* | 11/2015 | Friedlander .......... G06Q 20/401 705/75 |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0044385 A1 | 2/2016 | Kareenson et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0279807 A1* | 9/2017 | Berm dez ............... H04L 9/085 |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0324186 A1 | 11/2018 | Dintenfass et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1469419 A1 | 10/2004 |
| EP | 1783919 A1 | 5/2007 |
| EP | 2139196 A1 | 12/2009 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, et al., "Smart Card Technology: New Methods for Computer Access Control", Computer Science and Technology NIST Special Publication 500-157: pp. 1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-2019 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL:

(56) References Cited

OTHER PUBLICATIONS https://usa.visa.com/dam/VCOM/download/merchants/visa-account-updater-product-information-fact-sheet-for-merchants.pdf, 2 pages.
Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management", Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments", CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, et al., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, et al., "Goldbug BIG SEVEN open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, et al., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Plafform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.
Davison, et al., "MonoSLAM: Real-Time Single Camera SLAM", IEEE Transactions on Pattern Analysis and Machine Intelligence 29(6): pp. 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card User Authentication for Contactless Smart Cards based on Gesture Recognition", paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC", Annex Cloud [online] May 19, 2017 [retrieved on Jul. 3, 2019]. Retrieved from Internet URL: https://www.annexcloude.com/blog/benefits-unified-platform/, 13 pages.
International Search Report and Written Opinion for International

(56) References Cited

OTHER PUBLICATIONS

Patent Application No. PCT/US2020/023602 dated Jul. 22, 2020, 13 pages.

* cited by examiner

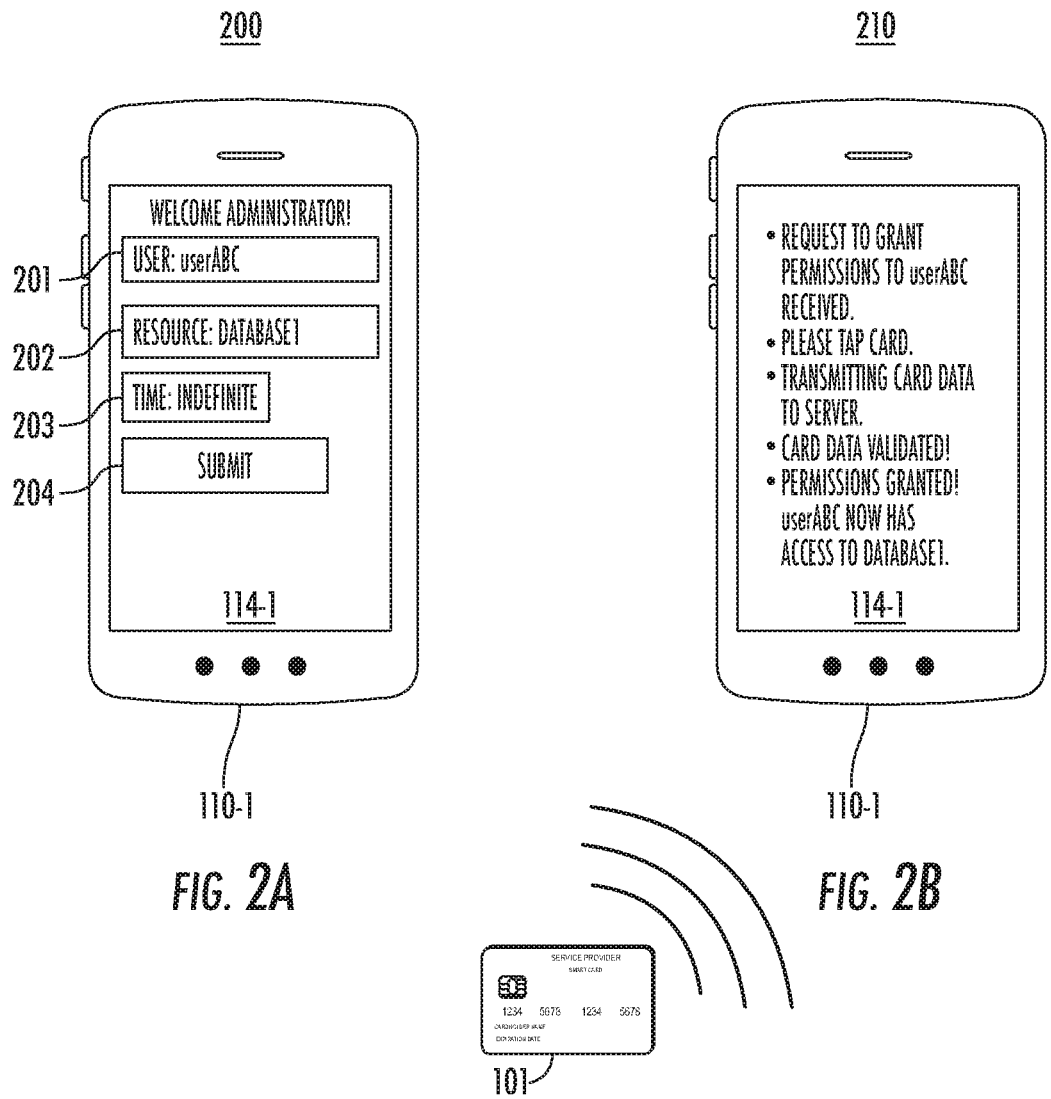

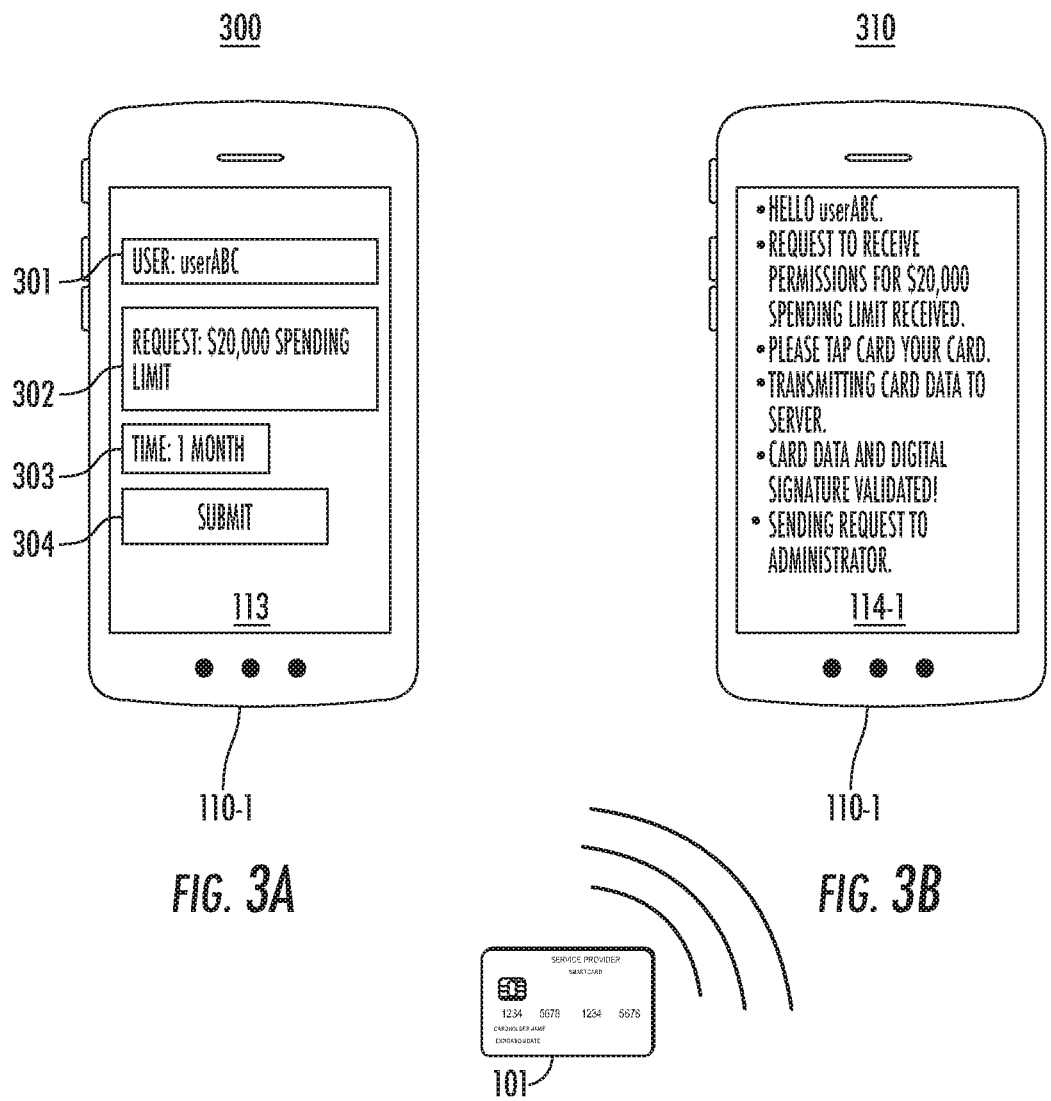

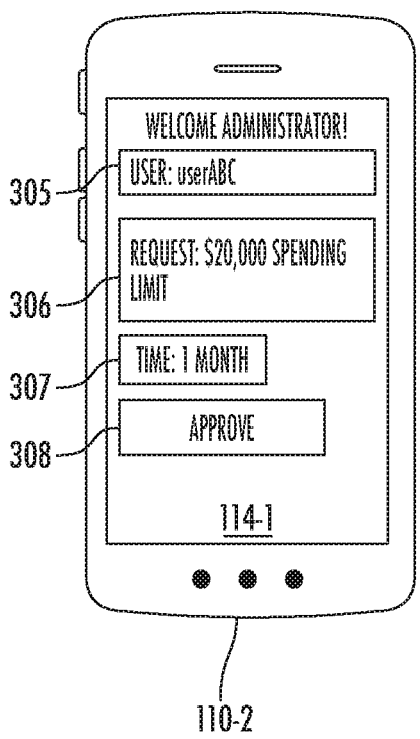
FIG. 3C
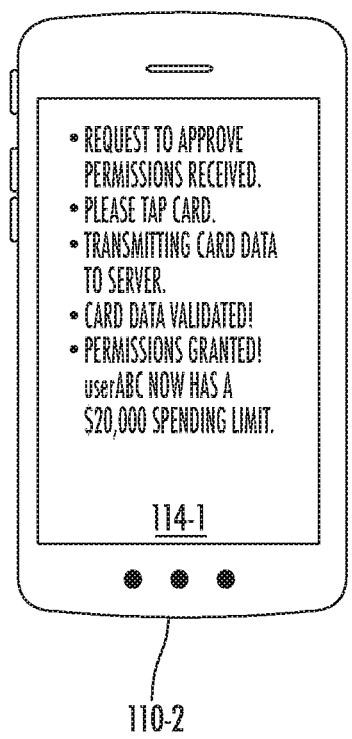
FIG. 3D
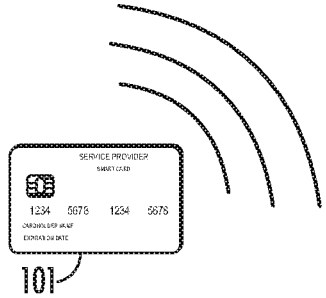

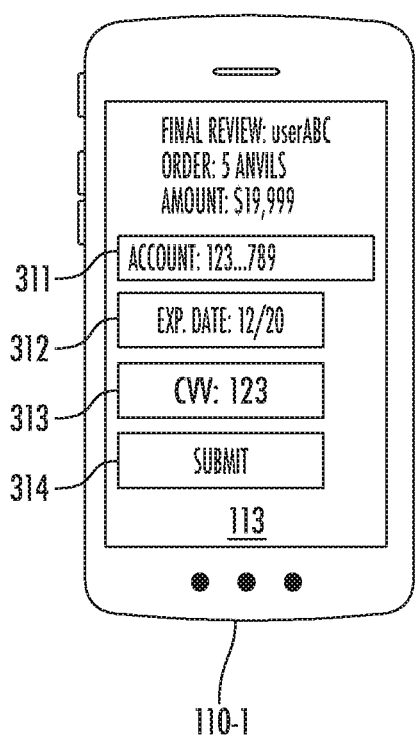
FIG. 3E
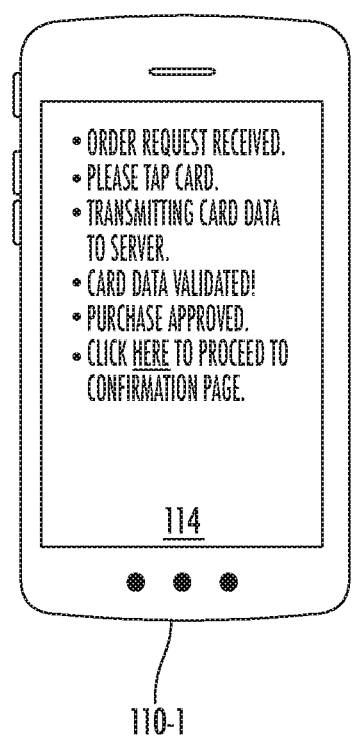
FIG. 3F

DELEGATED ADMINISTRATION OF PERMISSIONS USING A CONTACTLESS CARD

TECHNICAL FIELD

Embodiments herein generally relate to computing platforms, and more specifically, to delegated administration of permissions using a contactless card.

BACKGROUND

Users often must have permissions to access computing resources and/or perform actions using computing resources. The complexity and difficulty in managing permissions in an organization increases as the number of users in the organization increase. Conventional solutions to managing permissions require substantial user effort and often lack robust security measures.

SUMMARY

Embodiments disclosed herein provide systems, methods, articles of manufacture, and computer-readable media for delegated administration of permissions using a contactless card. In one example, a permissions module may receive a request from a first account to grant a second account access to a computing resource, the computing resource comprising one or more of: (i) an application, (ii) a data, and (iii) an operation performed using the application. The permissions module may receive, from a communications interface of a contactless card associated with the first account, permissions data associated with the first account and encrypted data generated by the contactless card, an applet of the contactless card to generate the encrypted data based at least in part on a private key for the contactless card stored in a memory of the contactless card. The permissions module may transmit the permissions data and the encrypted data to an authentication server. The authentication server may verify the encrypted data by decrypting the encrypted data based at least in part on a private key for the contactless card associated with the first account stored in a memory of the authentication server, and determine, based on the permissions data associated with the first account, that the first account has permissions to grant access to the computing resource to the second account. The permissions module may receive, from the authentication server, an indication of the verification of the encrypted data and a permissions vector associated with the second account, the permissions vector reflecting the grant of access to the computing resource to the second account.

BRIEF DESCRIPTION OF THE DRAWINGS

FIGS. 2A-2B illustrate embodiments of delegated administration of permissions using a contactless card.

FIGS. 3A-3F illustrate embodiments of delegated administration of permissions using a contactless card.

DETAILED DESCRIPTION

Figure 1A:
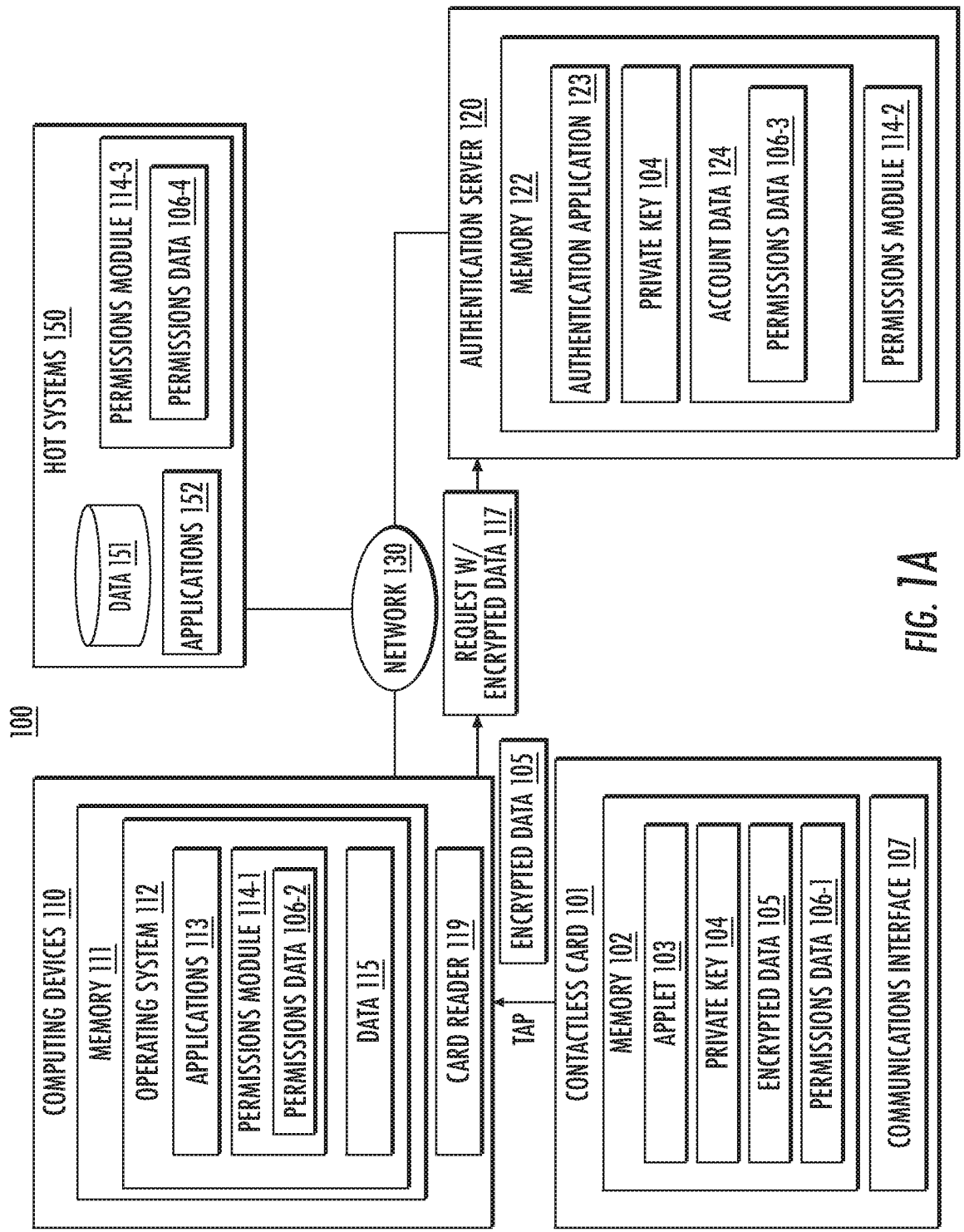
FIGS. 1A-1B illustrate embodiments of a system that implements delegated administration of permissions using a contactless card.

Embodiments disclosed herein provide secure techniques to use a contactless card for delegated administration of permissions. Generally, during the manufacturing of a contactless card, the contactless card is personalized to include data for an associated user. For example, a memory of the contactless card may store one or more applets, a private key, card data (e.g., an account number, etc.), and permissions data. The user associated with the contactless card may then delegate permissions, access resources, and/or perform operations using the contactless card.

For example, a first user may wish to access data stored in a database via a computing device. A permissions module may control access to the database and may output a notification specifying that the user tap their contactless card to the computing device. The user may then tap their contactless card to the computing device, which may cause the contactless card to come within communications range of the computing device. Doing so causes the applet executing in the contactless card to generate encrypted data using the private key which is then transmitted to the computing device along with the permissions data stored in the memory of the contactless card. The permissions module may receive the encrypted data generated by the contactless card and the permissions data and transmit the received data to an authentication server for validation. The authentication server may then validate the encrypted data using a copy of the private key stored in a memory (or other secure element, such as a hardware security module (HSM)) of the server. If the authentication server can decrypt the encrypted data using the private key, the authentication server validates the encrypted data and transmits an indication of the validation to the permissions module. In some embodiments, the authentication server transmits an instance of the permissions data for the user to the permissions module. The permissions module may then permit the user to access the data stored in the database based on the receipt of the indication of the validation of the encrypted data by the authentication server.

Advantageously, embodiments disclosed herein improve the security of devices, applications, and/or data. For example, by requiring validation of encrypted data generated by the contactless card to access applications and/or data, the security of the applications and/or data are improved. As another example, by requiring validation of the encrypted data prior to performing operations (e.g., making purchases, extending credit, etc.), the security of such operations and associated assets is improved. Further still, by requiring validation of the encrypted data as a condition to any attempts to delegate permissions, the security of delegated administration of permissions is improved.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more computing devices 110, one or more authentication servers 120, and one or more host systems 150. The contactless cards 101 are representative of any type of payment card, such as a credit card, debit card, ATM card, gift card, and the like. The contactless cards 101 may comprise one or more communications interfaces 107, such as a radio frequency identification (RFID) chip, configured to communicate with the computing devices 110 via NFC, the EMV standard, or other short-range protocols in wireless communication. Although NFC is used as an example communications protocol, the disclosure is equally applicable to other types of wireless communications, such as Bluetooth, and/or Wi-Fi. The computing devices 110 are representative of any type of network-enabled computing devices, such as smartphones, tablet computers, wearable devices, laptops, portable gaming devices, mobile devices, workstations, desktop computers, servers, and the like. The authentication server 120 and host systems 150 are representative of any type of computing device, such as a server, workstation, compute cluster, cloud computing platform, virtualized computing system, and the like.

As shown, a memory 111 of the computing device 110 includes an instance of an operating system (OS) 112. Example operating systems 112 include the Android® OS, iOS®, Linux®, macOS®, and Windows® operating systems. As shown, the OS 112 includes one or more applications 113, an instance of a permissions module 114-1, and data 115. The applications 113 are representative of any type of executable code, such as applications, services, scripts, and the like. The data 115 is representative of any data stored in a computer-readable medium. Although depicted as being stored in the memory 102, the data 115 may be stored in a non-volatile storage of the computing devices 110 (or communicably attached to the computing devices 110).

The permissions module 114 (including the permissions module 114-1, the permissions module 114-2 of the server 120, and the permissions module 114-3 of the host systems 150) is generally configured to implement delegated permissions in the system 100 by confirming that an actor attempting to perform an operation has the requisite permissions as reflected in the permissions data 106 (including instances of permissions data 106-1, 106-2, 106-3, and 106-4). The permissions data 106 is representative of any data structure that reflects whether an associated user is allowed to perform an attempted operation and/or access a given resource. For example, the permissions data 106 may be a vector, where each element of the vector reflects whether the user can perform an attempted operation and/or access a given resource. The attempted operations may include any type of operation, such as users (e.g., administrators) granting, modifying, and/or revoking permissions to other users. Additional examples of attempted operations include executing applications (e.g., the applications 113 of the computing devices 110, the applications 152 of the host systems 150, etc.), accessing a specific feature and/or interface of an application, accessing data (e.g., the data 115 of the computing devices 110, the data 151 of the host systems 150, etc.), and performing operations using an application and/or data. Although depicted as a separate entity, the permissions module 114 and/or associated functionality described herein may be integrated into the OS 112, the applications 113, the applications 152, and/or any other permissions management platform. Therefore, the particular configuration depicted in FIGS. 1A-1B should not be considered limiting of the disclosure.

The permissions module 114 may further consider data generated by the contactless card 101 when determining whether to grant and/or deny an attempted operation. For example, a system administrator may use a permissions application 113 to grant a new employee access to an accounting application 113 and corresponding accounting data 151 of the host systems 150. The permissions module 114-1 and receive an indication of the attempted delegation of permissions from the permissions application 113 and/or the OS 112. The permissions module 114-1 may output a notification on the administrator's computing device 110 to complete the attempted delegation of permissions. The notification may instruct the user to tap the contactless card 101 to the computing device 110, thereby bringing the contactless card 101 sufficiently close to the card reader 119 of the computing device 110 to enable data transfer (e.g., NFC data transfer, Bluetooth data transfer, etc.) between the communications interface 107 of the contactless card 101 and the card reader 119 of the computing device 110. In some embodiments, the computing device 110 may trigger the card reader 119 via an application program interface (API) call. In one example, the computing device 110 triggers the card reader via an API call responsive to the receiving an indication of an attempted operation (e.g., from the OS 112, an application 113, the data 115, etc.). In addition and/or alternatively, the computing device 110 may trigger the card reader 119 based on periodically polling the card reader 119.

More generally, the computing device 110 may trigger the card reader 119 to engage in communications using any feasible method.

After communication has been established between computing device 110 and contactless card 101, the applet 103 executing on a processor (not pictured) of the contactless card 101 generates and transmits encrypted data 105 to the computing device 110 via the communications interface 107. For example, the applet 103 of the contactless card 101 may use a cryptographic algorithm to generate a cryptographic payload of encrypted data 105 based at least in part on the private key 104 stored in the memory 102 of the contactless card 101. In such an embodiment, the private key 104 and some other piece of data (e.g., a user identifier, an account identifier, etc.) may be provided as the input to the cryptographic algorithm, which outputs the encrypted data 105. Generally, the applet 103 may use any type of cryptographic algorithm and/or system to generate the encrypted data 105, and the use of a specific cryptographic algorithm as an example herein should not be considered limiting of the disclosure. In some embodiments, the applet 103 may perform encryption using a key diversification technique to generate the encrypted data 105. Examples of key diversification techniques are described in U.S. patent application Ser. No. 16/205,119, filed Nov. 29, 2018. The aforementioned patent application is incorporated by reference herein in its entirety.

Once generated, the applet 103 may transmit the encrypted data 105 to the permissions module 114-1 of the computing device 110, e.g., via NFC. In some embodiments, the applet 103 may transmit the permissions data 106-1 to the permissions module 114-1. The permissions module 114-1 may then generate an indication of the requested operation (or provide a received indication from the OS 112 and/or the applications 113) as part of a request 117 that includes the encrypted data 105. The request 117 generally includes the indication of the attempted operation (e.g., an account identifier of the new employee, an indication of the accounting data in the data 151, and an indication of the accounting application 113, etc.) and the encrypted data 105. The permissions module 114-1 may then transmit the request 117 (including the encrypted data 105) to the authentication application 123 of the authentication server 120. In some embodiments, however, the encrypted data 105 is transmitted separate from the request 117.

Once received, the authentication application 123 may then attempt to authenticate the encrypted data 105 received with the request 117. For example, the authentication application 123 may attempt to decrypt the encrypted data 105 using a copy of the private key 104 stored in the memory 122 of the authentication server 120. The private key 104 may be identical to the private key 104 stored in the memory 102 of the contactless card 101, where each contactless card 101 is manufactured to include a unique private key 104 (and the authentication server 120 stores a corresponding copy of each unique private key 104). Therefore, the authentication application 123 may successfully decrypt the encrypted data 105, thereby verifying the encrypted data 105. Although the private key 104 is depicted as being stored in the memory 122, the private key 104 may be stored elsewhere, such as in a secure element and/or a hardware security module (HSM). In such embodiments, the secure element and/or the HSM may decrypt the encrypted data 105 using the private key 104 and a cryptographic function.

For example, as stated, the user identifier of the user requesting to perform an operation may be used to generate the encrypted data 105. In such an example, the authentication application 123 may decrypt the encrypted data 105 using the private key 104 of the authentication server 120. If the result of the decryption yields the user identifier associated with the account of the requesting user in the account data 124, the authentication application 123 verifies the encrypted data 105. If the authentication application 123 is unable to decrypt the encrypted data to yield the expected result (e.g., the user identifier of the account associated with the contactless card 101), the authentication application 123 does not validate the encrypted data 105. Due to the failed verification, the authentication application 123 transmits an indication of the failed validation to the permissions module 114-1, which denies the requested operation (e.g., the request to grant the new employee access to the accounting application 113 and/or the accounting data 151).

If the authentication application 123 validates the encrypted data 105, the authentication application 123 and/or the permissions module 114-2 may determine whether the requesting user has permissions to grant the new employee access to the identified resources. For example, the authentication application 123 and/or the permissions module 114-2 may determine whether the permissions data 106-3 for the requesting user in the account data 124 (and/or permissions data 106-1, 106-2 received from the computing device 110) indicates whether the administrator has permissions to grant access to the new employee.

Figure 1B:
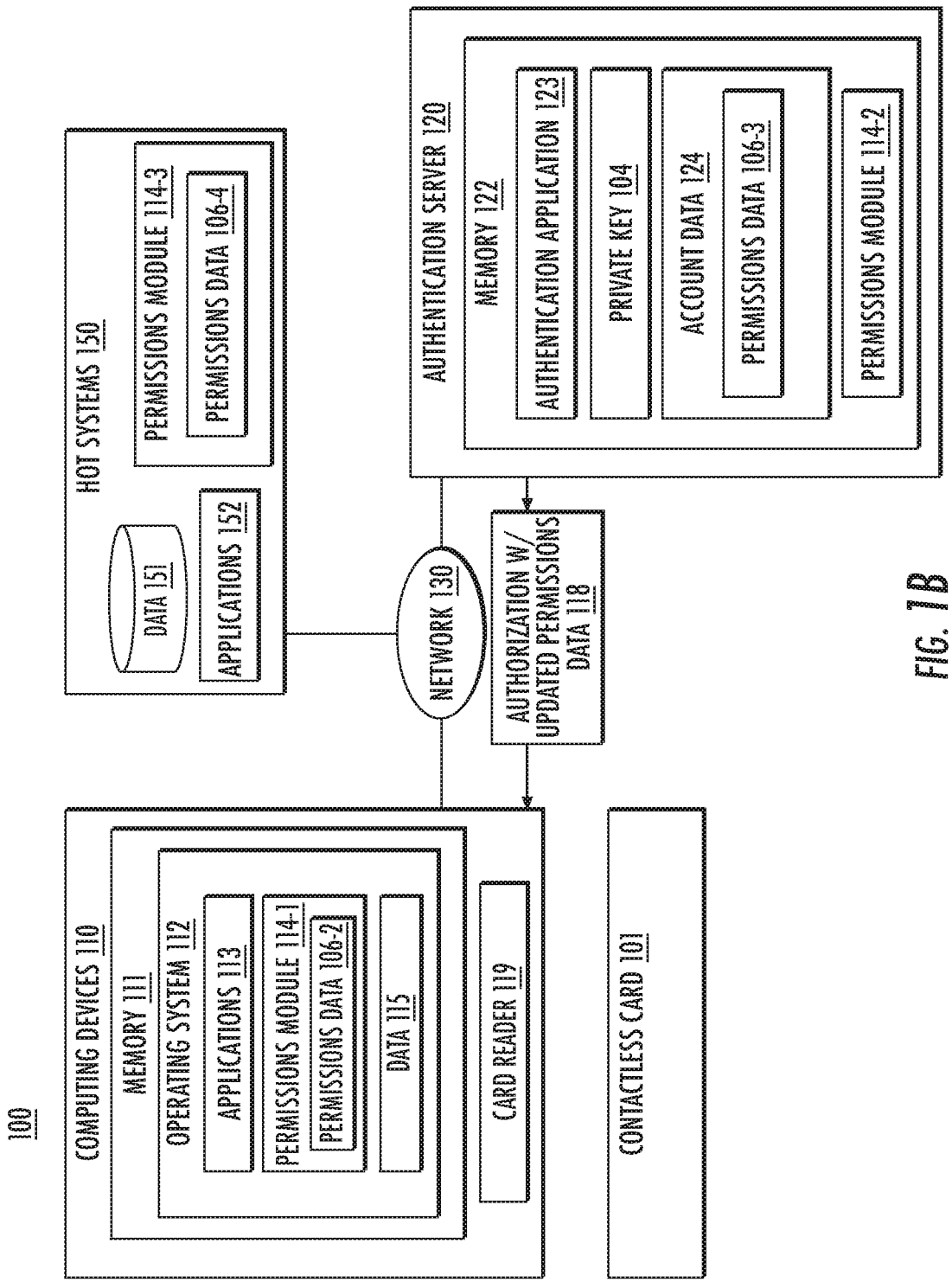

FIG. 1B depicts an embodiment where the authentication application 123 and/or the permissions module 114-2 has determined that the permissions data 106 reflects that the administrator has permissions to grant access to the new employee. In response, the authentication application 123 and/or the permissions module 114-2 may transmit an authorization 118 to the permissions module 114-1 of the computing device 110. Furthermore, the authentication application 123 and/or the permissions module 114-2 may update the permissions data 106-3 of the new employee to reflect that the new employee may access the accounting application 113 and the accounting data in the data 151. Therefore, the authorization 118 may include the updated permissions data 106. The permissions module 114-1 and/or the permissions application 113 may then output an indication of the authorization to the administrator. The permissions module 114-1 may further update the permissions data 106-1 in the contactless card 101, e.g., when the contactless card 101 is subsequently tapped to the device 110.

If, however, the authentication application 123 and/or the permissions module 114-2 determines that the permissions data 106 reflects that the administrator does not have permissions to grant access to the new employee, the authentication application 123 and/or the permissions module 114-2 may deny the requested operation. In such an embodiment, the authentication application 123 and/or the permissions module 114-2 would transmit an indication of the denial to the permissions module 114-1, which in turn may output the indication of the denial to the administrator.

In some embodiments, the permissions module 114-1 executing on the computing device 110 may determine whether the permissions data 106-2 (and/or the permissions data 106-1 of the contactless card 101) reflects whether the administrator has permissions to grant access to the new employee. Therefore, in such embodiments, the permissions module 114-1 determines whether the permissions data 106-2 (and/or the permissions data 106-1 of the contactless card 101) reflects whether the administrator has permissions to grant access to the new employee responsive to receiving an indication that the authentication application 123 has validated the encrypted data 105. Similarly, if the request is to access a resource of the host systems 150, the permissions module 114-3 may determine whether the permissions data 106-4 (and/or permissions data 106-1, 106-2 received from the requesting computing device 110) reflects whether the administrator has permissions to grant access to the new employee responsive to receiving an indication that the authentication application 123 has validated the encrypted data 105.

The technique described above may be used for any type of attempted operation in the system 100. For example, if the new employee subsequently attempts to open the accounting application 113 using their computing device 110, the permissions module 114-1 would require the new employee to tap their contactless card 101 to the computing device 110. In response, the applet 103 would generate encrypted data 105 using the private key 104 and the account identifier of the new employee. The permissions module 114-1 would then receive the encrypted data 105 and transmit the encrypted data 105 as part of a request to access the accounting application 113. The authentication application 123 may then attempt to verify the encrypted data 105 as described above. If the verification of the encrypted data 105 is successful, the authentication application 123 and/or the permissions module 114-2, may permit and/or deny the requested access to the accounting application 113 based on the permissions data 106 in the account data 124 for the new employee.

Although FIGS. 1A-1B are described with reference to an example business organization, the disclosure is equally applicable to other groups, such as families, educational institutions, and the like. For example, a parent may wish to provide their child with limited access to a checking account. In such an example, the parent may use an account management application 113 to delegate access to the checking account according to one or more rules. The rules may include spending limits, merchant restrictions, time limits, and/or geographical limits. The permissions module 114-1 may then instruct the parent to tap their contactless card 101 to the computing device 110 to generate encrypted data 105, which may be validated by the authentication application 123. Once validated, the permissions data 106 for the parent's account (and/or a subaccount generated for the child) may be updated to reflect that the child is able to use funds in the checking account according to the rules specified by the parent. In one embodiment, a virtual account number may be generated for the child's account. The virtual account number may be tied to the parent's checking account and be restricted based on the rules specified by the parent.

FIG. 2A is a schematic 200 depicting an example embodiment of tapping the contactless card 101 for delegated administration of permissions. As shown, the permissions module 114-1 executing on a computing device 110-1 displays a graphical user interface (GUI) to delegate permissions. Although depicted as part of the permissions module 114-1, the GUI may be part of a different application 113. As shown, the GUI includes form fields 201-203. More specifically, a user field 201 corresponds to a user to whom permissions are being delegated, a resource field 202 corresponds to a resource for which permissions are being delegated, and time field 203 corresponds to an amount of time the permissions are being delegated for. Therefore, as shown, the user has entered an example user "userABC" in field 201, an example resource "database1" (e.g., corresponding to data 151) in field 202, and an indefinite time duration in field 203. The user may then select the submit button 204.

FIG. 2B is a schematic 210 depicting an embodiment where the user has selected the submit button 204 in FIG. 2A. As shown, the permissions module 114-1 instructs a user to tap the contactless card 101 to the computing device 110-1 to complete the delegation of permissions to userABC. As stated, once the user taps the contactless card 101 to the computing device 110-1, the contactless card 101 generates the encrypted data 105 and transmits the encrypted data 105 to the permissions module 114-1. In some embodiments, the contactless card 101 transmits the permissions data 106-1 to the permissions module 114-1. The permissions module 114-1 may generate a request package specifying the requested permissions (e.g., indefinite access to database 1 for userABC). The permissions module 114-1 then transmits the request and encrypted data 105 to the authentication server 120. In some embodiments, the permissions module 114-1 may transmit the permissions data 106-1 and/or 106-2 to the authentication application 123.

The authentication application 123 may then verify the encrypted data 105 by decrypting the encrypted data 105 with the private key 104 of the server 120. Once verified, the authentication application 123 and/or the permissions module 114-2 determines whether the requesting user has permissions to give userABC access to the database. As stated the authentication application 123 and/or the permissions module 114-2 may determine whether the requesting user has permissions based on the permissions data 106, which may include the permissions data 106-1, 106-2, 106-3 and/or 106-4. If the requesting user has permissions, the authentication application 123 and/or the permissions module 114-2 may update the permissions data 106 for the target user (userABC in this example) to reflect the indefinite access to database1. The permissions data 106-1, 106-2, 106-3, and/or 106-4 may each be updated to reflect that userABC has indefinite access to database 1.

FIG. 3A is a schematic 300 illustrating an embodiment where a user may request the grant of permissions from another user. As shown, an example application 113 executing on a computing device 110-1 may include a GUI with form fields 301-303. Although depicted being outputted by the application 113, the form fields 301-303 may be outputted by the permissions module 114-1 of the computing device 110-1. More specifically, a user field 301 corresponds to a user who is requesting permissions, a resource field 302 corresponds to a resource for which permissions are being requested, and time field 303 corresponds to an amount of time the permissions are being requested for. Therefore, as shown, the user has entered an example user "userABC" in field 301, an example resource "$20,000 spending limit" in field 302, and a one-month time duration in field 303. In some embodiments, the spending limit may be associated with an application 113, an account, and the like. The user may then select the submit button 304.

FIG. 3B is a schematic 310 depicting an embodiment where the user has selected the submit button 304 in FIG. 3A. As shown, the permissions module 114-1 on the computing device 110-1 instructs a user to tap the contactless card 101 to the computing device 110-1 to process the request for permissions for userABC to have a $20,000 spending limit. As stated, once the user taps the contactless card 101 to the computing device 110, the contactless card 101 generates the encrypted data 105 and transmits the encrypted data 105 to the permissions module 114-1. In some embodiments, the contactless card 101 transmits the permissions data 106-1 to the permissions module 114-1. In at least one embodiment, the applet 103 of the contactless card 101 generates a digital signature using the private key 104. The digital signature may sign the encrypted data 105 and/or permissions data 106-1. The contactless card 101 may then transmit the digital signature with the encrypted data 105 and/or the permissions data 106-1.

The permissions module 114-1 may then generate a request package specifying the requested permissions (e.g., userABC to have a $20,000 spending limit for one month). The request may further specify an account associated with the requested spending limit, an account of the requesting user (e.g., the account number of the contactless card 101 of userABC), an application 113 associated with the requested spending limit, etc. The permissions module 114-1 then transmits the request, digital signature, and encrypted data 105 to the authentication server 120. In some embodiments, the permissions module 114-1 may transmit the permissions data 106-1 and/or 106-2 to the authentication application 123.

The authentication application 123 may then verify the encrypted data 105 by decrypting the encrypted data 105 with the private key 104 of the server 120. The authentication application 123 may also verify the digital signature by decrypting the digital signature using a public key associated with the contactless card 101 and stored by the server 120. Once the authentication application 123 verifies the encrypted data 105 the digital signature the authentication application 123 and/or the permissions module 114-2 may transmit a notification (or another indication) to an administrator (or other user) with sufficient permissions to approve the request.

FIG. 3C is a schematic 320 illustrating an embodiment where the permissions module 114-1 executing on a computing device 110-2 of an administrator has received the notification from the authentication application 123 and/or the permissions module 114-2 as described above with reference to FIG. 3B. As shown, the permissions module 114-1 outputs a GUI with fields 305-307 reflecting the requested user, requested permission, and time duration, respectively. The administrator may select the approve button 308 to initiate approval of the requested spending limit.

FIG. 3D is a schematic 330 illustrating an embodiment where the administrator has selected approve button 308 in FIG. 3C. As shown, the permissions module 114-1 instructs a user to tap the contactless card 101 to the computing device 110-2 to complete the delegation of permissions to userABC. As stated, once the user taps the contactless card 101 to the computing device 110-2, the contactless card 101 generates the encrypted data 105 and transmits the encrypted data 105 to the permissions module 114-1. In some embodiments, the contactless card 101 transmits the permissions data 106-1 of the administrator to the permissions module 114-1. The permissions module 114-1 may generate a request package specifying the requested permissions (e.g., a $20,000 spending limit for userABC for one month). The request may further specify an account associated with the requested spending limit (e.g., the account number of the contactless card 101 of userABC), an account of the requesting user, an application 113 associated with the requested spending limit, etc. The permissions module 114-1 then transmits the request and encrypted data 105 to the authentication server 120. In some embodiments, the permissions module 114-1 may transmit the permissions data 106-1 and/or 106-2 for the administrator to the authentication application 123.

The authentication application 123 may then verify the encrypted data 105 by decrypting the encrypted data 105 with the private key 104 of the server 120. Once verified, the authentication application 123 and/or the permissions module 114-2 determines whether the requesting user has permissions to give userABC access to the requested spending limit. As stated, the authentication application 123 and/or the permissions module 114-2 may determine whether the administrator has permissions based on the permissions data 106, which may include the permissions data 106-1, 106-2, 106-3 and/or 106-4. If the administrator has permissions, the authentication application 123 and/or the permissions module 114-2 may update the permissions data 106 for the target user (userABC in this example) to reflect the $20,000 spending limit for 1 month. The permissions data 106-1, 106-2, 106-3, and/or 106-4 may each be updated to reflect that userABC has a $20,000 spending limit for 1 month. As stated in some embodiments, a virtual account number may be generated for userABC for the stated spending limit and duration. The virtual account number may further be restricted based on merchant, geographic location, and/or any other parameter. In some embodiments, the account number of the contactless card 101 of the user (userABC in this example) may be granted the $20,000 spending limit for one month.

FIG. 3E is a schematic 340 illustrating an embodiment where the userABC attempts to make a purchase using an application 113. The application 113 may be a merchant application, web browser, or any other application configured to process a payment and/or transfer funds. As shown, the application 113 includes form payment fields 311-313 corresponding to an account number field, expiration date field, and card verification value (CVV) field, respectively. As shown, the user has entered an example account number, expiration date, and CVV into fields 311-313, respectively. The account number may be a limited-time use virtual account number and/or the account number of the contactless card 101 of the user (userABC in this example).

FIG. 3F is a schematic 350 depicting an embodiment where the user has selected the submit button 314 in FIG. 3E. As shown, the permissions module 114-1 instructs a user to tap the contactless card 101 to the computing device 110-1 to complete the requested purchase. As stated, once the user taps the contactless card 101 to the computing device 110-1, the contactless card 101 generates the encrypted data 105 and transmits the encrypted data 105 to the permissions module 114-1. In some embodiments, the contactless card 101 transmits the permissions data 106-1 to the permissions module 114-1. The permissions module 114-1 may generate a request package specifying the requested permissions (e.g., a purchase totaling $19,999). The permissions module 114-1 then transmits the request and encrypted data 105 to the authentication server 120. In some embodiments, the permissions module 114-1 may transmit the permissions data 106-1 and/or 106-2 to the authentication application 123.

The authentication application 123 may then verify the encrypted data 105 by decrypting the encrypted data 105 with the private key 104 of the server 120. Once verified, the authentication application 123 and/or the permissions module 114-2 determines whether the requesting user has permissions to spend $19,999. As stated the authentication application 123 and/or the permissions module 114-2 may determine whether the requesting user has permissions based on the permissions data 106, which may include the permissions data 106-1, 106-2, 106-3 and/or 106-4. The permissions data 106 may reflect an available spending limit for the requesting user and the 1-month duration for the spending limit. If the requesting user has a sufficient spending limit and is within the 1-month period for the spending limit as reflected by the permissions data 106, the authentication application 123 and/or the permissions module 114-2 may approve the requested purchase. Otherwise, the requested purchase is denied.

If approved, the authentication application 123 and/or the permissions module 114-2 may update the permissions data 106 for the target user (userABC in this example) to reflect that $19,999 has been spent by the userABC. Generally, the permissions data 106-1, 106-2, 106-3, and/or 106-4 may each be updated to reflect that $19,999 has been spent by the userABC. The authentication application 123 and/or the permissions module 114-2 may then transmit an indication of the approval to the permissions module 114-1 on the computing device 110-1. The permissions module 114-1 may then transmit an indication of the approval to the application 113, which processes the purchase.

Figure 4:
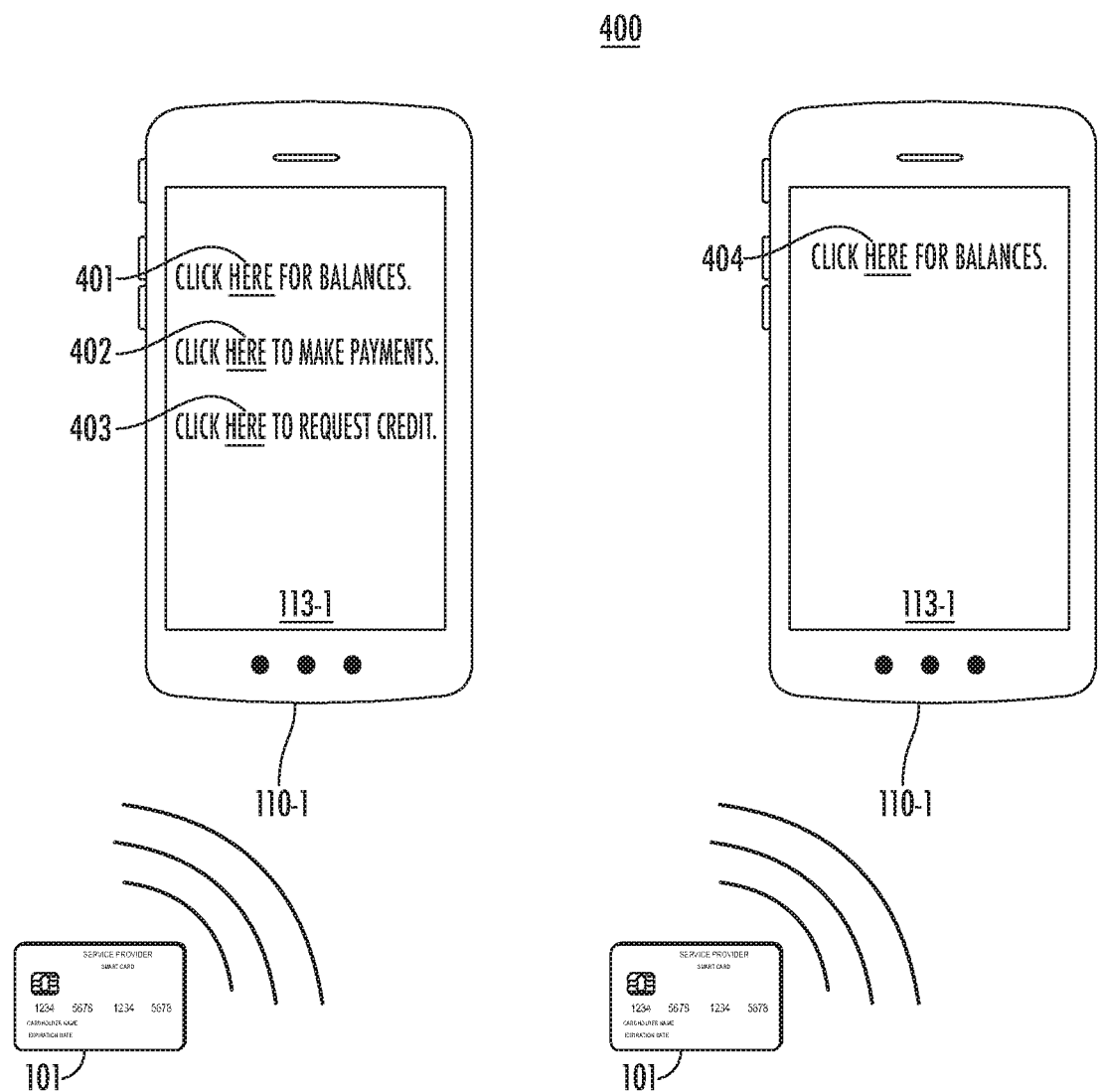
FIG. 4 illustrates an embodiment of delegated administration of permissions using a contactless card.

FIG. 4 is a schematic 400 depicting an embodiment of using a contactless card for permissions on a first computing device 110-1 and a second computing device 110-2. As shown, the computing devices 110-1, 110-2 each execute an example application 113-1. However, the functionality provided by the application 113-1 on the devices 110-1, 110-2 are different. As stated, the permissions data 106-1 of the contactless cards 101 may be used to control the functionality, appearance, and/or any other attribute of an application.

For example, when executing the application 113-1 on the device 110-1, the permissions module 114-1 may output an indication specifying to tap the contactless card 101-1 to the device 110-1. Doing so may cause the contactless card 101-1 to generate and transmit encrypted data 105 for validation by the authentication application 123 as described above. Furthermore, as stated, the contactless card 101-1 may transmit the permissions data 106-1 to the permissions module 114-1 of the device 110-1. The permissions module 114-1 may then transmit, to the application 113-1, the permissions data 106-1 and/or an indication of which features of the application 113-1 to expose. In response, the application 113-1 exposes three features associated with links 401-403 on the device 110-1. For example, as shown, link 401 is associated with an interface to view account balances that can be accessed by the user associated with contactless card 101-1, while link 402 is associated with a payment interface that can be accessed by the user associated with contactless card 101-1, while link 403 is associated with an interface that can be accessed by the user associated with contactless card 101-1 to request credit.

However, as shown, when the user associated with contactless card 101-2 taps the contactless card 101-2 to computing device 110-2, the permissions data 106-1 permits exposure of more limited functions of the application 113-1. For example, as shown, the application 113-1 on the computing device 110-2 exposes, based on the permissions data 106-2 received from the contactless card 101-2, the interface associated with link 404, namely the interface to view account balances. However, the application 113-1 on the computing device 110-2 does not expose other interface (e.g., the payments interface, the credit request interface, etc.).

Therefore, as stated, the permissions module 114-1 restricts and/or permits user access to different functions, pages, and/or any other attribute of the application 113-1 based on the permissions data 106 associated with the user associated a given contactless card 101-1. In some embodiments, the permissions data 106-1 stored in the contactless card is clear text that may be directly read by the computing devices 110. In such embodiments, the generate encrypted data 105 may not be generated and/or verified by the authentication server 120. Such an embodiment is useful, for example, when a given device 110 does not have Internet access. However, in some such embodiments, the user may be required to provide local login credentials on the computing device 110 to improve security.

Figure 5:
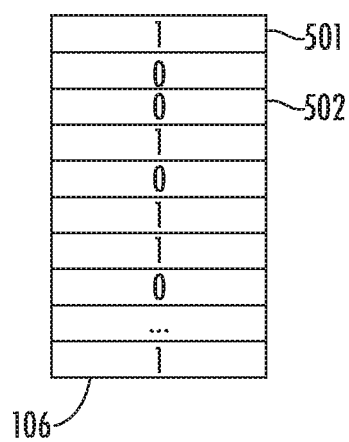
FIG. 5 illustrates an embodiment of permissions data.

FIG. 5 depicts an example portion of permissions data 106, according to one embodiment. As shown, the permissions data 106 is a vector of binary values. Each element of the permissions data 106 may specify whether the associated user is permitted access to an associated resource and/or perform operation. For example, as shown, the value of "1" in element 501 of the permissions data 106 may indicate the user is permitted to access a resource and/or perform an operation. Similarly, the value of "0" in element 502 of the permissions data 106 may indicate the user is not permitted to access a resource and/or perform an operation. As stated, the elements of permissions data 106 (including elements 501, 502) may be associated with granting, modifying, and/or revoking permissions to other users, executing applications (e.g., the applications 113 of the computing devices 110, the applications 152 of the host systems 150, etc.), accessing a specific feature and/or interface of an application, accessing data (e.g., the data 115 of the computing devices 110, the data 151 of the host systems 150, etc.), and performing operations using an application and/or data.

Figure 6:
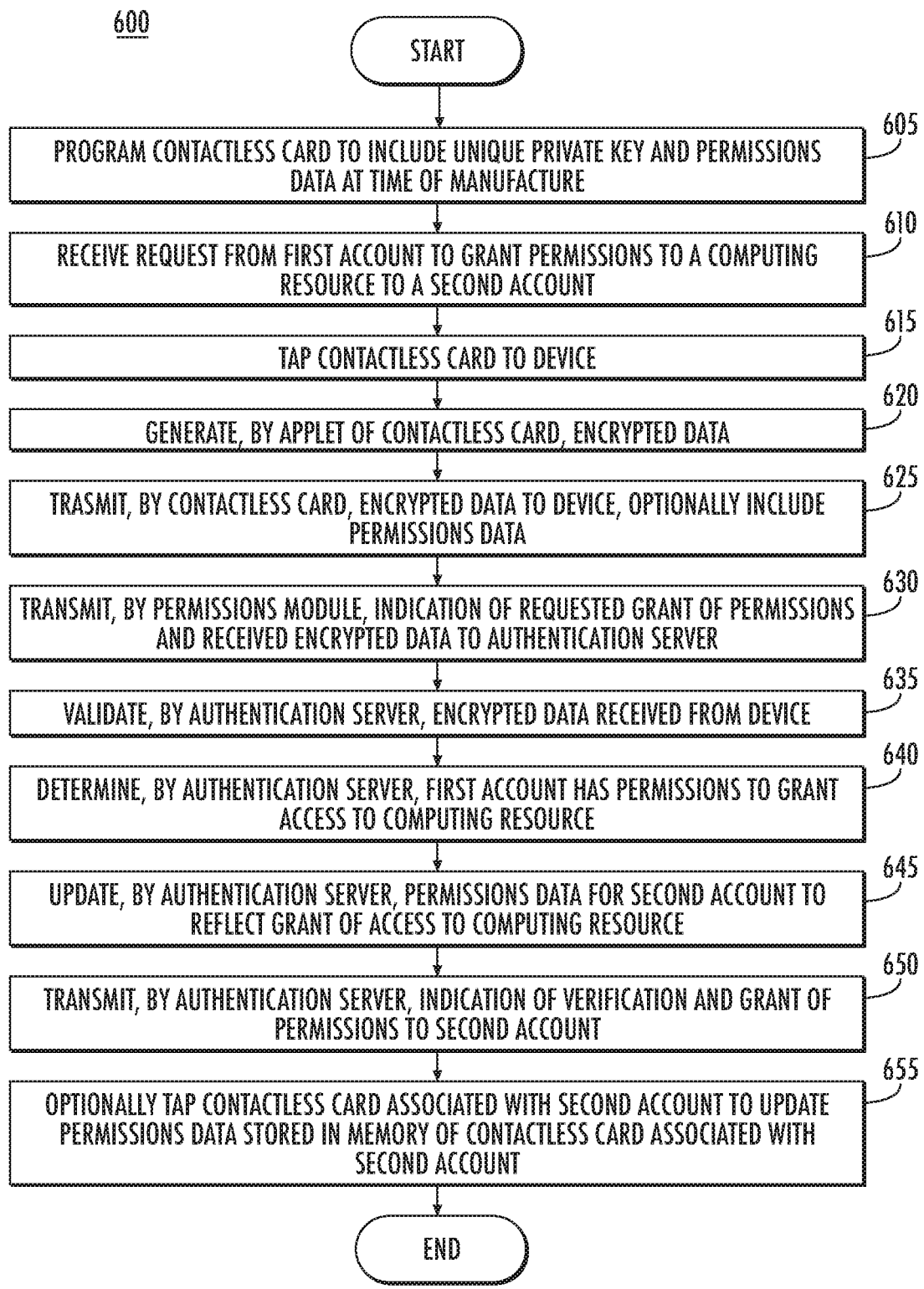
FIG. 6 illustrates an embodiment of a first logic flow.

FIG. 6 illustrates an embodiment of a logic flow 600. The logic flow 600 may be representative of some or all of the operations executed by one or more embodiments described herein. For example, the logic flow 600 may include some or all of the operations performed for delegated administration of permissions using a contactless card 101. Embodiments are not limited in this context.

As shown, the logic flow 600 begins at block 605, where one or more contactless cards 101 are programmed to include a unique private key 104 and permissions data 106-1 at the time of manufacture. For example, the permissions data 106-3 in the account data 124 of the associated user may be programmed into the memory 102 of the contactless card 101 for the user at the time of manufacture. At block 610, the permissions module 114-1 executing on a computing device 110 may receive a request from a first account to grant, to a second account, permissions to a computing resource and/or to perform an operation. For example, the user of the first account may wish to grant the user of the second account access to the data 151 and/or applications 152 of the host systems 150. At block 615, a user associated with the first account taps the contactless card 101 to the computing device 110 to cause the contactless card 101 to generate and transmit encrypted data 105. At block 620, the applet 103 of the contactless card 101 may then generate the encrypted data 105 using the private key 104, input data (e.g., the user identifier), and a cryptographic algorithm. At block 625, the applet 103 may transmit the encrypted data 105 and the permissions data 106-1 to the permissions module 114-1 of the computing device 110.

At block 630, the permissions module 114-1 of the computing device 110 transmits the encrypted data 105 and a request to grant specified permissions to the second account to the authentication server 120. For example, the request may specify to grant, by the first account, permissions to the second account to access the specified data 151 and/or applications 152 of the host systems 150. In some embodiments, the permissions module 114-1 may transmit the permissions data 106-1 and/or the permissions data 106-2 to the authentication server 120. In other embodiments, the permissions module 114 may refrain from transmitting the permissions data to the server 120. At block 635, the authentication application 123 decrypts the encrypted data 105 using the private key 104 of the authentication server 120 to validate the encrypted data 105.

At block 640, the authentication application 123 determines that the first account has permissions to grant the requested access to the second account. For example, the authentication application 123 may reference the permissions data 106-3 for the first account stored in the account data 124 to determine whether the first account has the required permissions. As another example, the authentication application 123 may use the received permissions data 106-1 and/or permissions data 106-2. At block 645, the authentication application 123 updates the permissions data 106 for the second account to reflect the grant of access to the specified resources. For example, the authentication application 123 may update the permissions data 106-3 for the second account stored in the account data 124 to reflect that the second account is permitted to access the specified data 151 and/or applications 152 of the host systems 150. Similarly, the updates may be pushed to other instances of the permissions data 106 for the second account (e.g., the permissions data 106-1 on the contactless card 101 of the user of the second account, the permissions data 106-2 on the computing device 110 of the user of the second account, the permissions data 106-4 of the host systems 150, etc.).

At block 650, the authentication application 123 may transmit, to the permissions module 114-1, an indication of the verification of the encrypted data 105 and the grant of permissions to the second account. In some embodiments, the authentication application 123 may transmit, to the permissions module 114-1, the permissions data 106-3 for the second account. At block 655, the user of the second account may tap their contactless card 101 to a computing device 110 to update the permissions data 106-1 stored in the contactless card 101 to reflect the grant of permissions.

Figure 7:
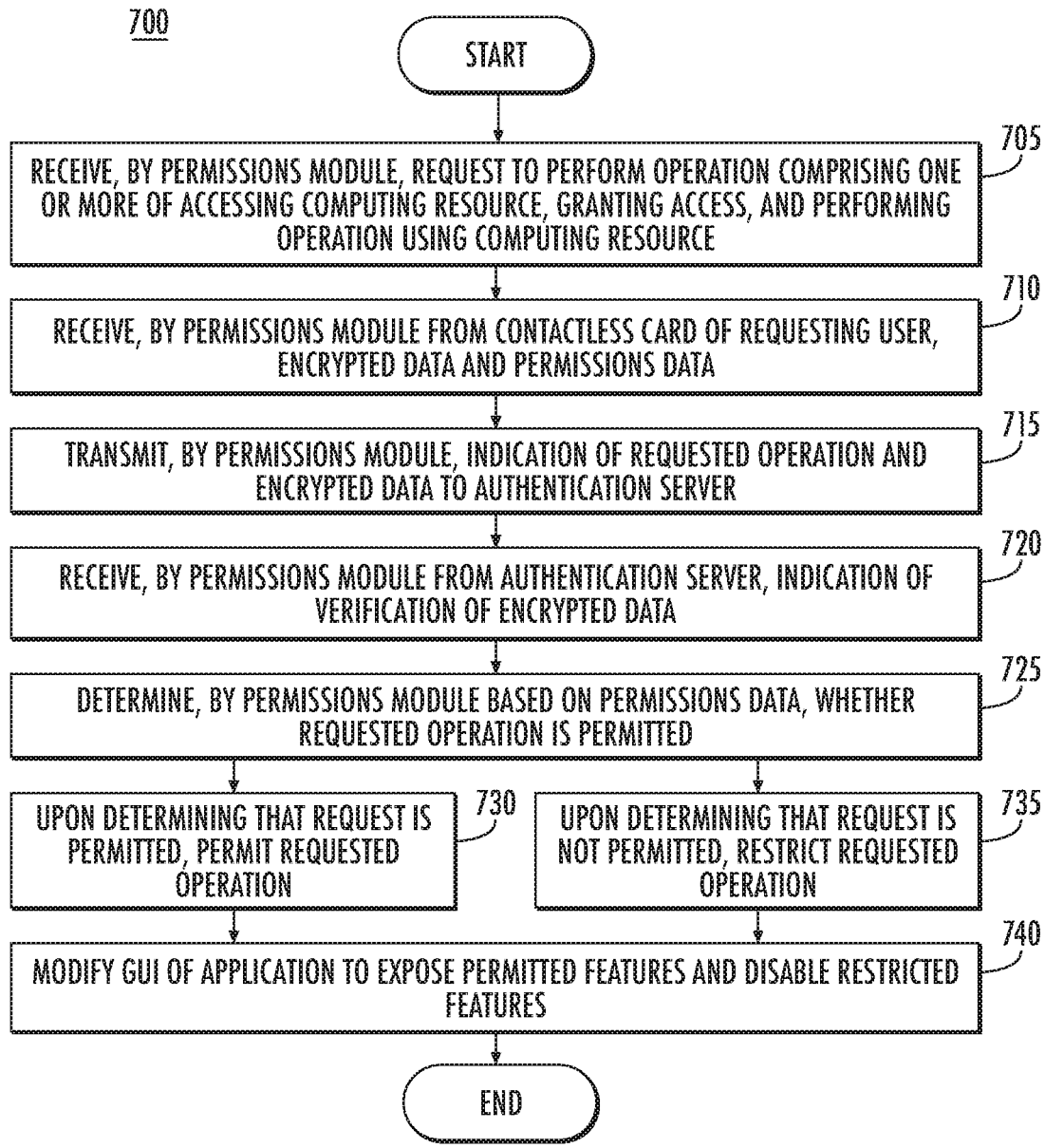
FIG. 7 illustrates an embodiment of a second logic flow.

FIG. 7 illustrates an embodiment of a logic flow 700. The logic flow 700 may be representative of some or all of the operations executed by one or more embodiments described herein. For example, the logic flow 700 may include some or all of the operations to modify application features based on permissions data. Embodiments are not limited in this context.

As shown, the logic flow 700 begins at block 705, where the permissions module 114-1 executing on a computing device 110 receives a request to perform an operation, e.g., from an application 113 and/or the OS 112. The operation may include, but is not limited to, accessing a computing resource, granting permissions, modifying permissions, revoking permissions, and/or performing an operation using a computing resource. At block 710, a user associated with the request taps a contactless card 101 to the computing device 110 to cause the contactless card 101 to generate and transmit encrypted data 105. The applet 103 of the contactless card 101 may then generate the encrypted data 105 using the private key 104, input data (e.g., the user identifier), and a cryptographic algorithm. The applet 103 may transmit the encrypted data 105 and the permissions data 106-1 to the permissions module 114-1 of the computing device 110.

At block 715, the permissions module 114-1 of the computing device 110 transmits the encrypted data 105 and an indication of the requested operation to the authentication server 120. In some embodiments, the permissions module 114-1 may transmit the permissions data 106-1 and/or the permissions data 106-2 to the authentication server 120. The authentication application 123 may then decrypt the encrypted data 105 using the private key 104 of the authentication server 120 to validate the encrypted data 105. At block 720, the permissions module 114-1 receives, from the authentication server 120, an indication of the verification of the encrypted data 105. The permissions module 114-1 may further receive the permissions data 106-3 of the requesting account from the authentication server 120.

At block 725, the permissions module 114-1 determines whether the requested operation is permitted based on the permissions data 106-1, 106-2, 106-3, and/or 106-4 for the requesting account. At block 730, the permissions module 114-1 permits the requested operation upon determining the permissions data 106 specifies that the operation is permitted (e.g., based on a lookup of the entry of permissions data 106 associated with the requested operation). If, however, the permissions data 106 does not permit the requested operation, at block 735, the permissions module 114-1 restricts performance of the requested operation. For example, if the requested operation is to open an application, the permissions module 114-1 would restrict the application from being opened. Furthermore, if the requested operation is to open an application and/or a specific portion of an application, at block 740, the permissions module 114-1 and/or the application may modify the GUI of the application to expose features permitted by the permissions data 106 and disable features that are not permitted by the permissions data 106.

Figure 8:
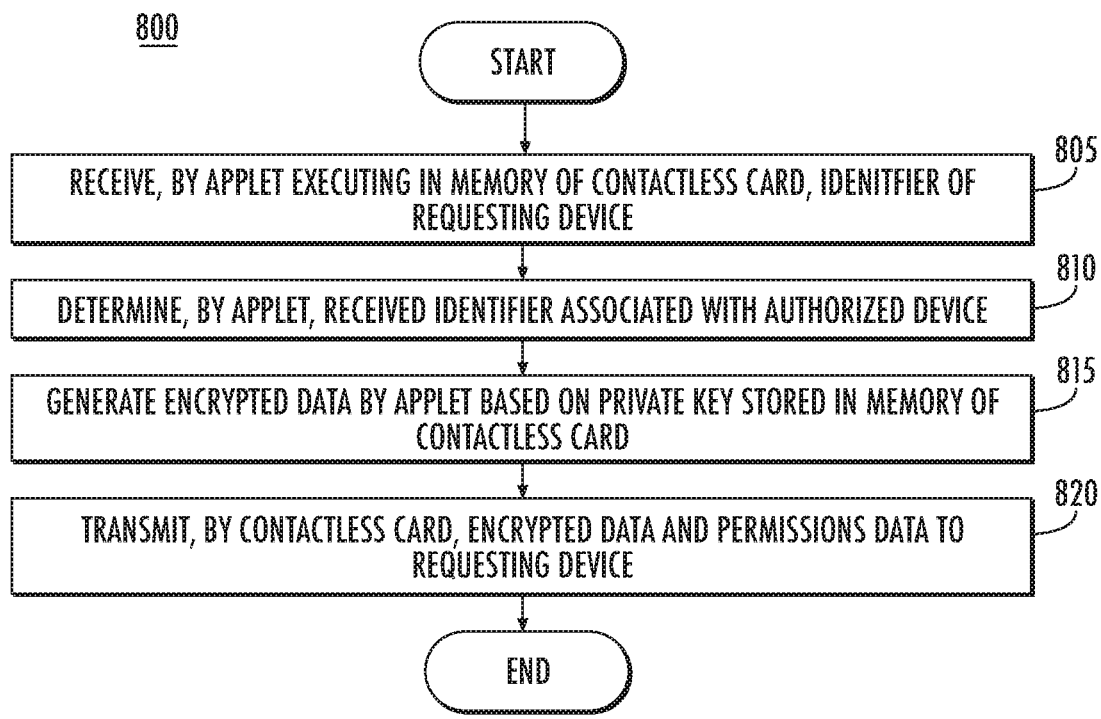
FIG. 8 illustrates an embodiment of a third logic flow.

FIG. 8 illustrates an embodiment of a logic flow 800. The logic flow 800 may be representative of some or all of the operations executed by one or more embodiments described herein. For example, the logic flow 800 may include some or all of the operations performed by the applet 103 of the contactless card 101. Embodiments are not limited in this context.

As shown, the logic flow 800 begins at block 805, where the applet 103 of the contactless card 101 receives an identifier of a requesting device 110. The identifier may be a media access control (MAC) address, software fingerprint, device identifier, and the like. The requesting device 110 may be any device including an instance of the permissions module 114-1 that is brought within communications range of the contactless card 101. At block 810, the applet 103 that the received identifier is specified as an authorized identifier in the memory 102 of the contactless card. At block 815, the applet 103 generates encrypted data 105 based on the private key, input data, and a cryptographic function. At block 820, the contactless card 101 transmits the encrypted data 105 and the permissions data 106-1 of the contactless card 101 to the requesting device 110.

Figure 9:
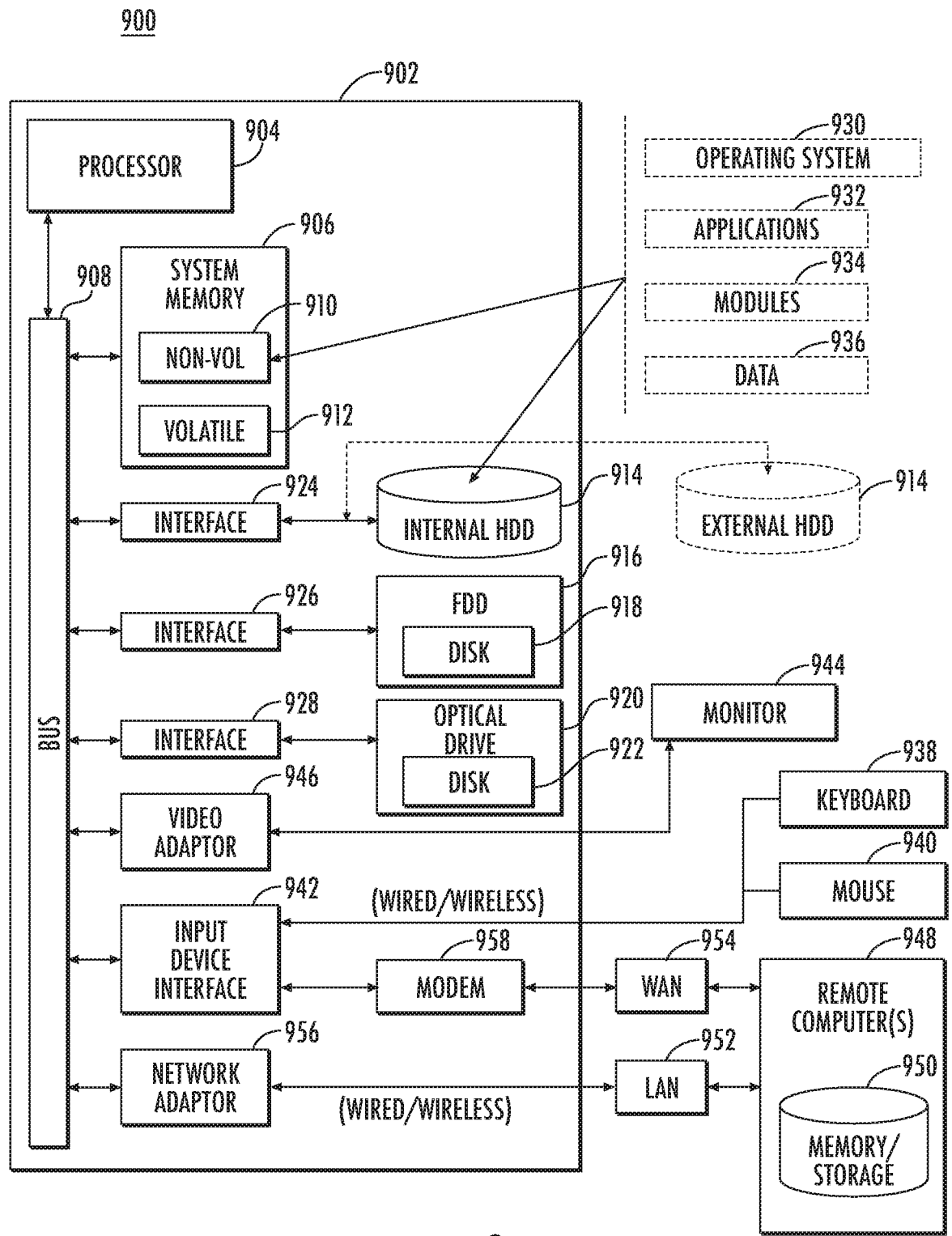
FIG. 9 illustrates an embodiment of a computing architecture.

FIG. 9 illustrates an embodiment of an exemplary computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the system 100. In some embodiments, computing system 902 may be representative, for example, of the contactless card 101, computing devices 110, authentication server 120, and/or the host systems 150 of the system 100. The embodiments are not limited in this context. More generally, the computing architecture 900 is configured to implement all logic, applications, systems, methods, apparatuses, and functionality described herein with reference to FIGS. 1-8.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100, e.g., the applet 103, private keys 104, encrypted data 105, permissions data 106, operating system 112, applications 113, the permissions module 114, the authentication application 123, the host systems 150, data 151, and/or applications 152.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 952 and the WAN 954.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10A:
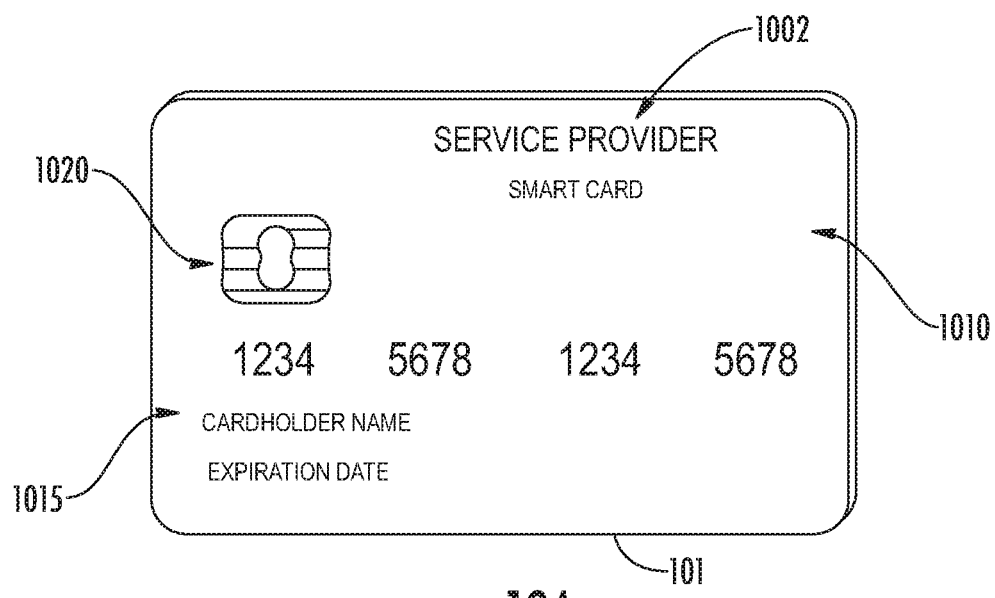
FIGS. 10A-10B illustrate an example contactless card.

FIG. 10A illustrates a contactless card 101, which may comprise a payment card, such as a credit card, debit card, and/or a gift card. As shown, the contactless card 101 may be issued by a service provider 1002 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 1010, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 1015 displayed on the front and/or back of the card, and a contact pad 1020. The contact pad 1020 may be configured to establish contact with another communication device, such as the mobile devices 110, a user device, smart phone, laptop, desktop, or tablet computer. The contactless card 101 may also include processing circuitry, antenna and other components not shown in FIG. 10A. These components may be located behind the contact pad 1020 or elsewhere on the substrate 1010. The contactless card 101 may also include a magnetic strip or tape, which may be located on the back of the card (not shown in FIG. 10A).

Figure 10B:
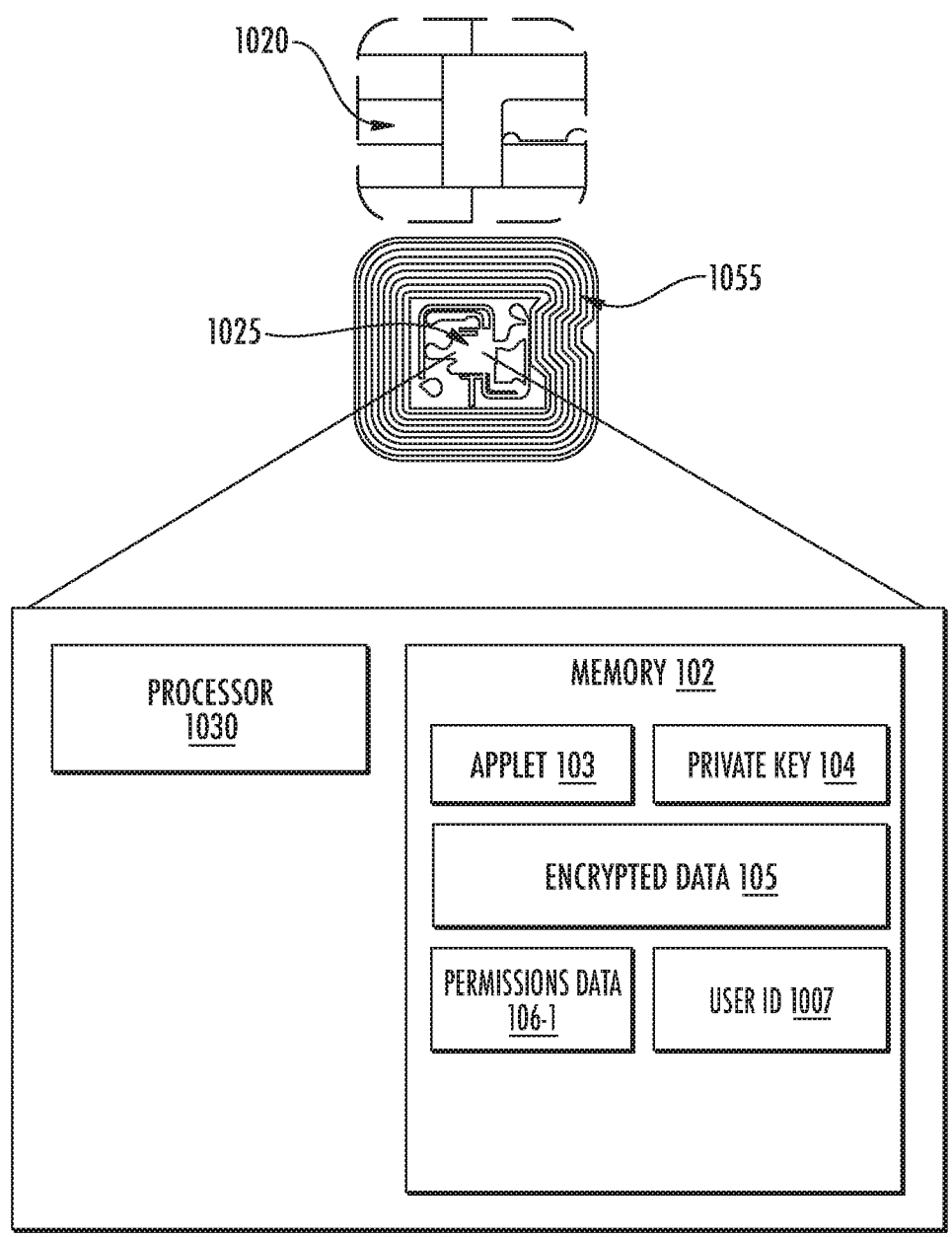

As illustrated in FIG. 10B, the contact pad 1020 of contactless card 101 may include processing circuitry 1025 for storing and processing information, including a microprocessor 1030 and the memory 102. It is understood that the processing circuitry 1025 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. A read/write memory may also be read many times after leaving the factory.

The memory 102 may be configured to one or more of the applets 103, a private key 104, the encrypted data 105, the permissions data 106-1, and one or more user identifiers (IDs) 1007. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The user ID 1007 may comprise a unique alphanumeric identifier assigned to a user of the contactless card 101, and the identifier may distinguish the user of the contactless card from other contactless card users. In some examples, the user ID 1007 may identify both a customer and an account assigned to that customer and may further identify the contactless card associated with the customer's account. In some embodiments, the applets 103 may use the customer ID 1007 as input to a cryptographic algorithm with the private key 104 to generate the encrypted data 105.

The processor and memory elements of the foregoing exemplary embodiments are described with reference to the contact pad, but the present disclosure is not limited thereto. It is understood that these elements may be implemented outside of the pad 1020 or entirely separate from it, or as further elements in addition to processor 1030 and memory 102 elements located within the contact pad 1020.

In some examples, the contactless card 101 may comprise one or more antennas 1055. The one or more antennas 1055 may be placed within the contactless card 101 and around the processing circuitry 1025 of the contact pad 1020. For example, the one or more antennas 1055 may be integral with the processing circuitry 1025 and the one or more antennas 1055 may be used with an external booster coil. As another example, the one or more antennas 1055 may be external to the contact pad 1020 and the processing circuitry 1025.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 1055, processing circuitry 1025, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., of the device 110), and produce an NDEF message that comprises a cryptographically secure OTP encoded as an NDEF text tag.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system, comprising:
a processor circuit; and
a memory storing an application and instructions which when executed by the processor circuit, cause the processor circuit to perform the steps of:
receiving a first request comprising a first account, a second account, and a computing resource, the computing resource comprising one or more of: (i) the application, (ii) a data, and (iii) an operation;
receiving, from a first contactless card, permissions data of the first account and encrypted data;
transmitting the permissions data and the encrypted data to an authentication server;

receiving, from the authentication server, a result that the authentication server decrypted the encrypted data;

receiving, from the authentication server, a permissions vector of the second account, the permissions vector comprising a plurality of entries;

determining, based on the permissions vector of the second account, that the second account was granted access to the computing resource;

receiving a second request comprising the second account and the computing resource;

granting the second account access to the computing resource based on the permissions vector of the second account;

disabling a first feature of the computing resource based on a first entry of the plurality of entries of the permissions vector for the second account; and providing a second feature of the computing resource based on a second entry of the plurality of entries of the permissions vector for the second account.

2. The system of claim 1, the memory storing instructions which when executed by the processor circuit, cause the processor circuit to perform the steps of:
determining, based on the permissions vector of the second account, that the second account is authorized to access the computing resource.

3. The system of claim 2, wherein the computing resource comprises the application, wherein the second request comprises the application, the memory storing instructions which when executed by the processor circuit, cause the processor circuit to perform the steps of:
receiving a third request comprising the second account and the operation, the operation comprising one or more of: (i) a purchase request, (ii) a credit request, and (iii) a request to transfer funds; and
determining, based on the permissions vector of the second account, that the second account is not authorized to perform the operation based on at least in part on an amount specified by the third request exceeds a maximum amount specified by the permissions vector.

4. The system of claim 1, the memory storing instructions which when executed by the processor circuit, cause the processor circuit to perform the steps of, prior to receiving the first request:
receiving a third request comprising the second account and the computing resource;
receiving, from a second contactless card of the second account, encrypted data and a digital signature;
transmitting the encrypted data and the digital signature received from the second contactless card to the authentication server;
receiving, from the authentication server, a second result that the authentication server decrypted the encrypted data received from the second contactless card; and
receiving, from the authentication server, a third result that the authentication server decrypted the digital signature was based on a public key.

5. The system of claim 1, wherein the permissions data is received from the contactless card according to at least one of near field communication (NFC), Bluetooth, and Wi-Fi, wherein the computing resource comprises the application, wherein the first and second features comprise a first interface and a second interface of the application, respectively.

6. A method, comprising:
receiving, by an application executing on a device, a first request comprising a first account, a second account, and a computing resource, the computing resource comprising one or more of: (i) the application, (ii) a data, and (iii) an operation;
receiving, by the application from a first contactless card, permissions data of the first account and encrypted data;
transmitting, by the application, the permissions data and the encrypted data to an authentication server;
receiving, by the application from the authentication server, a result that the authentication server decrypted the encrypted data;
receiving, by the application from the authentication server, a permissions vector of the second account, the permissions vector comprising a plurality of entries;
determining, by the application based on the permissions vector of the second account, that the second account was granted access to the computing resource;
receiving, by the application, a second request comprising the second account and the computing resource;
granting, by the application, the second account access to the computing resource based on the permissions by of the second account;
disabling, by the application, a first feature of the computing resource based on a first entry of the plurality of entries of the permissions vector for the second account; and
providing, by the application, a second feature of the computing resource based on a second entry of the plurality of entries of the permissions vector for the second account.

7. The method of claim 6, further comprising:
determining, by the application based on the permissions vector of the second account, that the second account is authorized to access the computing resource.

8. The method of claim 7, wherein the computing resource comprises the application, wherein the second request comprises the application, the method further comprising:
receiving, by the application, a third request comprising the second account and the operation, the operation comprising one or more of: (i) a purchase request, (ii) a credit request, and (iii) a request to transfer funds; and
determining, by the application based on the permissions vector of the second account, that the second account is not authorized to perform the operation based on at least in part on an amount specified by the third request exceeds a maximum amount specified by the permissions vector.

9. The method of claim 6, further comprising prior to receiving the first request:
receiving, by the application, a third request comprising the second account and the computing resource;
receiving, by the application from a second contactless card of the second account, encrypted data and a digital signature;
transmitting, by the application, the encrypted data and the digital signature received from the second contactless card to the authentication server;
receiving, by the application from the authentication server, a second result that the authentication server decrypted the encrypted data received from the second contactless card; and
receiving, by the application from the authentication server, a third result that the authentication server decrypted the digital signature was based on a public key.

10. The method of claim 6, wherein the permissions data is received from the contactless card according to at least one of near field communication (NFC), Bluetooth, and Wi-Fi, wherein the computing resource comprises the application, wherein the first and second features comprise a first interface and a second interface of the application, respectively.

11. The method of claim 6, further comprising:
receiving, by the application, a third request comprising the second account and the computing resource;
receiving, by the application from a second contactless card of the second account, encrypted data and a digital signature;
transmitting, by the application, the encrypted data and the digital signature received from the second contactless card to the authentication server;
receiving, by the application from the authentication server, a second result that the authentication server did not decrypt the encrypted data received from the second contactless card; and
rejecting, by the application, the third request based on the second result.

12. The method of claim 6, further comprising:
receiving, by the application, a third request comprising the first account and a second computing resource;
receiving, by the application from the first contactless card, a second encrypted data;
transmitting, by the application, the second encrypted data to the authentication server;
receiving, by the application from the authentication server, a second result that the authentication server did not decrypt the second encrypted data; and
rejecting, by the application, the third request based on the second result.

13. The method of claim 6, further comprising:
receiving, by the application, a third request comprising the first account, the second account, and a second computing resource;
determining, by the application based on the permissions vector for the first account, that the first account does not have access to the second computing resource; and
rejecting, by the application, the third request based on the determination that the first account does not have access to the second computing resource.

14. A non-transitory computer-readable storage medium storing computer-readable program code which when executed by a processor causes the processor to perform the steps of:
receiving a first request comprising a first account, a second account, and a computing resource, the computing resource comprising one or more of: (i) an application, (ii) a data, and (iii) an operation;
receiving, from a first contactless card, permissions data of the first account and encrypted data;
transmitting the permissions data and the encrypted data to an authentication server;
receiving, from the authentication server, a result that the authentication server decrypted the encrypted data;
receiving, from the authentication server, a permissions vector of the second account, the permissions vector comprising a plurality of entries;
determining, based on the permissions vector of the second account, that the second account was granted access to the computing resource;
receiving a second request comprising the second account and the computing resource;
granting the second account access to the computing resource based on the permissions vector of the second account;

disabling a first feature of the computing resource based on a first entry of the plurality of entries of the permissions vector for the second account; and
providing a second feature of the computing resource based on a second entry of the plurality of entries of the permissions vector for the second account.

15. The computer-readable storage medium of claim 14, storing computer-readable program code which when executed by the processor causes the processor to perform the steps of:
determining, based on the permissions vector of the second account, that the second account is authorized to access the computing resource.

16. The computer-readable storage medium of claim 15, wherein the computing resource comprises the application, wherein the second request comprises the application, the medium further storing computer-readable program code which when executed by the processor causes the processor to perform the steps of:
receiving a third request comprising the second account and the operation, the operation comprising one or more of: (i) a purchase request, (ii) a credit request, and (iii) a request to transfer funds; and
determining, based on the permissions vector of the second account, that the second account is not authorized to perform the operation based on at least in part on an amount specified by the third request exceeds a maximum amount specified by the permissions vector.

17. The computer-readable storage medium of claim 14, further storing computer-readable program code which when executed by the processor causes the processor to perform the steps of:
receiving a third request comprising the second account and the computing resource;
receiving, from a second contactless card of the second account, encrypted data and a digital signature;
transmitting the encrypted data and the digital signature received from the second contactless card to the authentication server;
receiving, from the authentication server, a second result that the authentication server decrypted the encrypted data received from the second contactless card; and
receiving, from the authentication server, a third result that the authentication server decrypted the digital signature was based on a public key.

18. The computer-readable storage medium of claim 14, wherein the permissions data is received from the contactless card according to at least one of near field communication (NFC), Bluetooth, and Wi-Fi, wherein the computing resource comprises the application, wherein the first and second features comprise a first interface and a second interface of the application, respectively.

19. The computer-readable storage medium of claim 14, further storing computer-readable program code which when executed by the processor causes the processor to perform the steps of:
receiving a third request comprising the second account and the computing resource;
receiving, from a second contactless card of the second account, encrypted data and a digital signature;
transmitting the encrypted data and the digital signature received from the second contactless card to the authentication server;
receiving, from the authentication server, a second result that the authentication server did not decrypt the encrypted data received from the second contactless card; and rejecting the third request based on the second result.

20. The system of claim 1, the memory storing instructions which when executed by the processor circuit, cause the processor circuit to perform the steps of:
   receiving a third request comprising the second account and the computing resource;
   receiving, from a second contactless card of the second account, encrypted data and a digital signature;
   transmitting the encrypted data and the digital signature received from the second contactless card to the authentication server;
   receiving, from the authentication server, a second result that the authentication server did not decrypt the encrypted data received from the second contactless card; and
   rejecting the third request based on the second result.

* * * * *